(12) United States Patent  (10) Patent No.: US 9,923,515 B2
Rodrigues et al.  (45) Date of Patent: Mar. 20, 2018

(54) SOLAR PANELS WITH CONTACTLESS PANEL-TO-PANEL CONNECTIONS

(71) Applicant: Building Materials Investment Corporation, Dallas, TX (US)

(72) Inventors: Tommy F. Rodrigues, Nutley, NJ (US); Sudhir Railkar, Wayne, NJ (US); Daniel E. Boss, Murphy, TX (US); Adem Chich, Kearny, NJ (US)

(73) Assignee: Building Materials Investment Corporation, Dallas, TX (US)

( * ) Notice: Subject to any disclaimer, the term of this patent is extended or adjusted under 35 U.S.C. 154(b) by 933 days.

(21) Appl. No.: 14/207,869

(22) Filed: Mar. 13, 2014

(65) Prior Publication Data

US 2014/0265609 A1 Sep. 18, 2014

Related U.S. Application Data

(60) Provisional application No. 61/791,574, filed on Mar. 15, 2013.

(51) Int. Cl.
| | |
|---|---|
| *H02J 1/00* | (2006.01) |
| *H02J 3/00* | (2006.01) |
| *H02S 40/34* | (2014.01) |
| *H02J 50/05* | (2016.01) |
| *H02J 50/10* | (2016.01) |
| *H02J 50/12* | (2016.01) |
| *H02J 3/38* | (2006.01) |
| *H02J 5/00* | (2016.01) |
| *H02S 40/36* | (2014.01) |
| *H02S 40/32* | (2014.01) |

(Continued)

(52) U.S. Cl.
CPC .............. *H02S 40/34* (2014.12); *H02J 3/383* (2013.01); *H02J 5/005* (2013.01); *H02J 50/05* (2016.02); *H02J 50/10* (2016.02); *H02J 50/12* (2016.02); *H02S 20/25* (2014.12); *H02S 40/32* (2014.12); *H02S 40/36* (2014.12); *H01F 38/14* (2013.01); *H02J 13/0075* (2013.01); *Y02B 10/12* (2013.01); *Y02E 10/563* (2013.01); *Y02E 40/72* (2013.01); *Y04S 10/123* (2013.01); *Y10T 307/724* (2015.04)

(58) Field of Classification Search
CPC ........ H02J 5/005; H02J 3/383; H02J 13/0075; H02J 50/05; H02J 50/10; H02J 50/12; H02S 40/32; H02S 20/25; H02S 40/36; H02S 40/34; Y02E 40/72; Y02E 10/563; Y02B 10/12; Y04S 10/123; H01F 38/14; Y10T 307/724
USPC ............................................................ 307/85
See application file for complete search history.

(56) References Cited

U.S. PATENT DOCUMENTS 7,431,470 B2 10/2008 Coleiro
7,479,774 B2 1/2009 Wai et al.
(Continued)

*Primary Examiner* — Richard Tan
(74) *Attorney, Agent, or Firm* — Womble Bond Dickinson (US) LLP

(57) ABSTRACT

A solar panel array comprises a first plurality of solar panels arranged side-by-side in a first course and a second plurality of solar panels arranged side-by-side in a second course, the second course partially overlapping the first course. Electrical energy produced by each solar panel of the array is aggregated with the electrical energy produced by the other solar panels of the array without physical electrical contacts between the solar panels. In one embodiment, contactless inductive couplers are used to couple the electrical energies of the panels together.

13 Claims, 1 Drawing Sheet

(51) Int. Cl.
*H02S 20/25* (2014.01)
*H01F 38/14* (2006.01)
*H02J 13/00* (2006.01)

(56) References Cited

U.S. PATENT DOCUMENTS

| | | |
|---|---|---|
| 7,819,114 B2 | 10/2010 | Augenbraun et al. |
| 8,305,741 B2 | 11/2012 | Chatterjee |
| 8,400,017 B2 | 3/2013 | Kurs et al. |
| 8,468,754 B2 | 6/2013 | Railkar et al. |
| 2010/0170169 A1 | 7/2010 | Railkar et al. |
| 2010/0180523 A1* | 7/2010 | Lena ............... H02S 20/25 52/173.3 |
| 2011/0017282 A1 | 1/2011 | Tas et al. |
| 2011/0267855 A1* | 11/2011 | Chapman ............ H02J 3/383 363/74 |
| 2012/0098346 A1* | 4/2012 | Garrity ............... H02J 3/383 307/82 |

* cited by examiner

SOLAR PANELS WITH CONTACTLESS PANEL-TO-PANEL CONNECTIONS

REFERENCE TO RELATED APPLICATION

Priority is hereby claimed to the filing date of U.S. provisional patent application 61/791,574 filed on Mar. 15, 2013.

TECHNICAL FIELD

This disclosure relates generally to solar panels for converting solar energy to electrical energy and more specifically to methods and devices for interconnecting solar panels of an array without physical electrical contacts between panels.

BACKGROUND

Roof mounted solar photovoltaic panels for generating renewable electrical energy are becoming ever more popular. This is due in part to the increasing development of solar technology and the reduction in the cost of solar collectors and panels. Further, smaller and lower profile solar collector panels are becoming available and such panels are more desirable for homeowners because they present a less objectionable architectural appearance when installed on a roof. In most cases, solar panels are installed on a roof in an array with a plurality of solar panels electrically interconnected to combine or aggregate their electrical outputs for use. One problem with traditional solar panel interconnections arises from the fact that they are electrically connected using wires and physical contact connectors such as plugs and jacks. This can cause problems if the connectors are not properly joined together, not properly secured, if the wires become pinched, or due to deterioration of the wires and corrosion of the connectors over time, which can result in electrical resistance that reduces the efficiency of a solar panel array. There is a need for a roof mounted solar panel system that addresses these and other issues inherent in traditional solar panel interconnection techniques. It is to the provision of such a system that the present invention is primarily directed.

SUMMARY

U.S. provisional patent application 61/791,574 filed on Mar. 15, 2013, to which priority is claimed above, is hereby incorporated by reference in its entirety.

A solar panel system is disclosed that is particularly suited for installation on the roof of a building such as a residential home. The system includes a plurality of solar panel modules each having a body with a forward active portion bearing an array of solar cells or other solar collectors and a rear headlap portion. The modules are designed to be installed on the roof of a building in courses with each course being defined by a line of side-by-side modules. The active portion of one course of modules at least partially overlaps the headlap portion of a next lower course of modules in a manner reminiscent of a traditional roofing shingle installation.

Contactless horizontal electrical couplers of opposite genders are formed on the opposing ends of the body of each solar panel module, a female coupler on one end and a male coupler on the other. Contactless vertical couplers are also formed in the headlap portion of each body and beneath the active portion of each body comprising, for instance, female couplers in the headlap portion and male couplers beneath the active portion. The electrical energy produced by modules in a course are electrically coupled together by the contactless horizontal couplers while modules in adjacent courses are electrically coupled together by the contactless vertical couplers. Thus, electrical interconnection of the solar panel modules is accomplished automatically when the modules are installed to aggregate the electrical energy they produce without the need for wires or physical electrical contacts. The electrical connections may be achieved through inductive or capacitive coupling and all wiring associated with the interconnections is contained within the modules themselves. By "contactless" it is meant that there is a lack of physical electrical contacts, although the structures of the couplers themselves may be in physical contact.

Accordingly, a solar panel system is now provided that addresses the issues mentioned above with prior art physical electrical connections between panels. The invention will be better appreciated upon review of the detailed description set forth below when taken in conjunction with the accompanying drawing figures, which are briefly described as follows.

DETAILED DESCRIPTION

Figure 1:
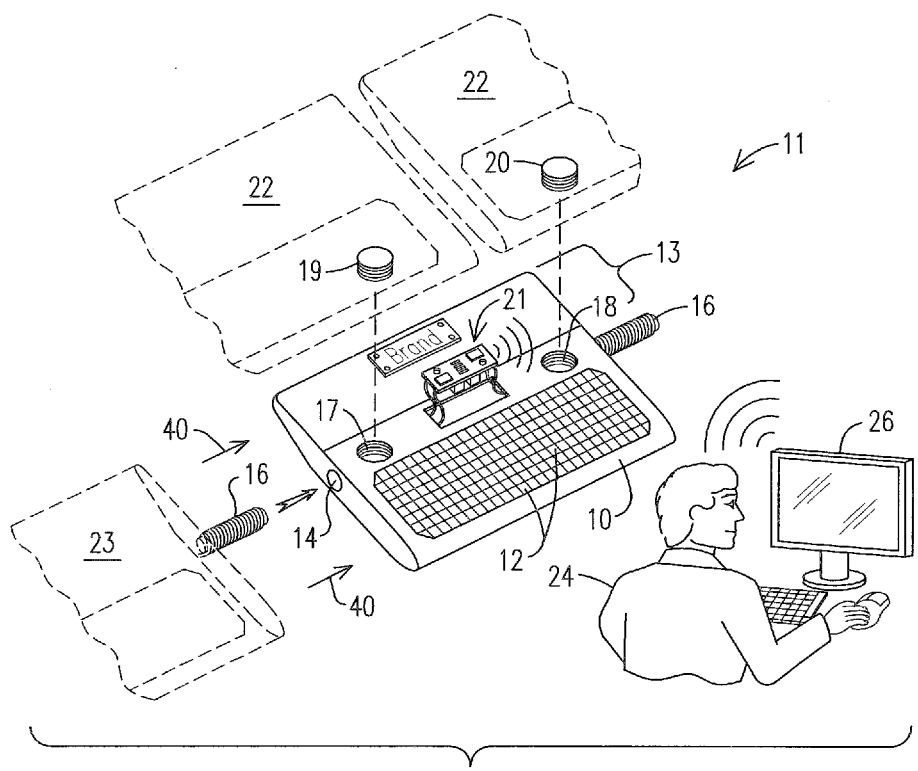
FIG. 1 is a perspective view of a solar panel system that embodies principles of the invention in one preferred form.

Referring in more detail to the drawing figures, in which like numerals indicate like parts throughout the views, FIG. 1 illustrates a solar panel system 11 that exemplifies principles of the invention in one example embodiment thereof. The system includes a plurality of like solar panel modules 10, 22, and 23 configured to be arranged on a roof in overlapping courses. Each module (exemplified by module 10) includes a module body having a forward active portion 12 that bears an array of solar cells or other solar collectors that produce electrical energy when exposed to sunlight. A headlap portion 13 of the module is located to the rear of the active portion 12 and is configured to be overlapped by active portions of solar panel modules of a next higher course of modules. Each solar panel module preferably carries an electronics package 21 that may include a microinverter for converting the DC voltage produced by the solar collector array to AC voltage. The electronics package also may include and RFID chip bearing an identifying code for the panel and Wi-Fi and/or Bluetooth transmitters for communicating wirelessly various status indicators for the system and individual modules to a user 24 through a computer 26.

The solar modules arranged side-by-side in a course are electrically coupled together to aggregate the electrical energy produced by each module. However, the coupling is accomplished without external wires or physical electrical contacts. More specifically, each solar panel module may have a female contactless coupler 14 formed on one end of the module and a male contactless coupler 16 formed on the opposite end of the module. When two side-by-side modules are brought together such as module 10 and module 23 (shown in phantom), the male contactless coupler 16 of one module aligns with and is received in the female contactless coupler of the adjacent module. As described in more detail below, this couples the electrical energy produced by the two modules together without physical electrical contacts, thereby aggregating the electrical energies produced by the separate modules. Thus are all solar modules in a course are electrically coupled together into a solar electric system.

A pair of female contactless couplers 17, 18 is formed within the headlap region 13 of each solar module on the top of the module. A corresponding pair of male contactless couplers 19, 20 is formed on the underside of the active portion of each panel. The male contactless couplers 19, 20 are configured and positioned on the module so that they are received within the female contactless couplers 17 and 18 respectively when a module of an upper course is overlapped with and installed onto modules of a next lower course. In this way, modules of one course are electrically coupled to modules of an adjacent course to aggregate the electrical energy produced by the respective courses of modules. Preferably, the internal inverters, which may be micro-inverters or nano-inverters, convert the DC voltage of the solar collectors to AC voltage and the AC voltage produced by each panel is coupled to the AC voltage of all other panels of the system. All of this aggregated AC electrical energy can then be captured and directed, preferably through wires, to a remote location where it can be placed on the public electrical grid or otherwise used to power local electrical devices.

Figure 2:
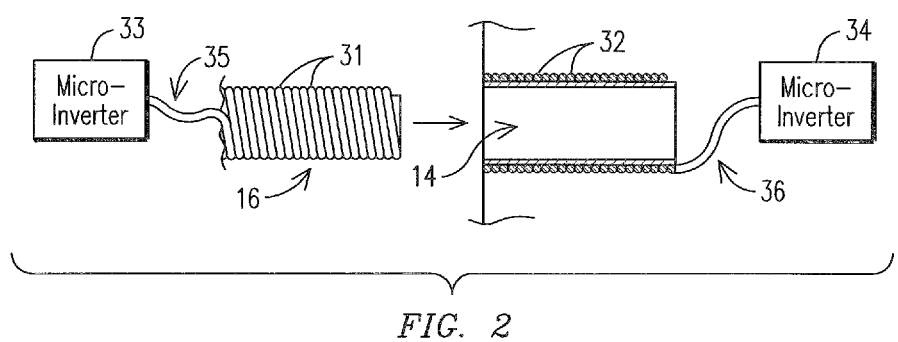
FIG. 2 is a schematic illustration of one type of contactless electrical connector usable with the present invention.

The contactless electrical couplers of the invention may be a variety of types of such couplers, but preferably are couplers that apply the principles of inductive coupling to interconnect solar modules of the system electrically. FIG. 2 is a simplified schematic illustration of such a coupler. The male coupling member 16 of a module carries a coil of wire 31 that may be thought of as the primary coil of a transformer. The coil, in turn, may be connected to and driven by a micro-inverter 33 of one solar module. This generates an oscillating electromagnetic field in the vicinity of the primary coil 31. The female coupling member 17 is formed as a socket sized to receive the male member axially therein and includes a coil of wire 32 wrapped around the outside of the socket. The coil of wire 32 may be thought of as a secondary coil of a transformer. The coil of wire 32 may, in turn, be connected to the micro-inverter 34 of another solar module. When the male member 16 of the coupler is inside the female member 14, they together form an efficient inductive transformer that couples the electrical energy produced by one module with that produced by a side-by-side module. As such, the electrical energy produced by modules in a course of modules is coupled and aggregated together.

The same principle applies to the vertical contactless couplers 17, 18, 19, and 20 in FIG. 1, except in this instance the modules of one course of modules are electrically coupled to the modules of a next adjacent course of modules. In this way, all of the electrical energy produced by all modules of a solar module system, both in a course and course-to-course, is coupled together in a contactless manner and aggregated as a single source that can be directed to the public electric grid or otherwise used by a homeowner.

While inductive coupling has been illustrated in the preferred embodiment, it will be understood that other types of contactless coupling such as, for instance, capacitive coupling might be substituted with equivalent results. Further, although the coupling of electrical energy may be more efficient when a primary coil and secondary coil are disposed one inside the other, coupling nevertheless might be accomplished by simply having the coils next to or in the vicinity of one another when modules are arranged side-by-side. Thus, the projecting male portions and socketed female portions may be eliminated and replaced with flat coils or capacitive plates inside the modules themselves that align with each other when the modules are arranged side-by-side. The same may be true of the vertical contactless coupling members. It will thus be understood that the male and female inductive couplers of the preferred embodiment are presented as an example only are not intended to be a restriction of the invention.

The contactless electrical couplers of the present invention also greatly simplify the installation of a solar module system so equipped. For instance, an initial module of a system is secured to a roof deck with screws or other fasteners. The next module of a course is simply urged toward the first module to couple the male and female contactless couplers together, whereupon the next module is secured to the roof deck. This is continued until a first course of modules is completed. To install the next higher course of modules, a first module of that course is placed above the first course with its active portion overlapping the headlap portions of modules in the first course. Preferably, the modules of one course are staggered relative to the modules of an adjacent course as shown in FIG. 1 to enhance water sheading capabilities of the system. The first module of the next higher course is then urged down onto the modules of the first course until its contactless couplers snap into the couplers of two modules of the next lower course. This module can then be secured to the roof deck, whereupon the next module of the second course is installed in side-by-side relationship with the first. This process continues until all modules and courses of the system are installed to complete the system. The electrical energy produced by each module of the system is aggregated without physical electrical contacts into a combined electrical energy of the system as a whole.

Accordingly, installation of a solar power system using modules of this invention does not require that an installer fiddle for wires and connectors beneath the individual modules, find connectors at the ends of the wires, and couple the connectors together. The potential for human error in this process is eliminated, as is the potential for defective connectors, pinched wires, and degradation of the physical electrical contacts over time. Instead, the installer simply snaps modules together, fastens them to a roof deck, and the installation is complete. To tap the aggregated AC electrical energy of the installed system, a contactless tap can be inserted in any of the contactless couplers of the system and the aggregated electrical energy of the system can be directed to a remote location through wiring for use or to supplement the public electrical grid.

The invention has been described herein in terms of preferred embodiments and methodologies considered by the inventor to exemplify the invention and represent the best mode of carrying out the invention. It will be understood by the skilled artisan; however, that a wide range of additions, deletions, and modifications, both subtle and gross, may be made to the illustrated and exemplary embodiments within the scope of the invention. For instance, the particular shape of the modules shown in the figures is not limiting and they may be made flatter or otherwise shaped as needed. The modules need not include a Wi-Fi feature that transmits the status of the array of modules and of each individual module, although this feature is helpful in managing the array of modules. Male and female members of the contactless couplers may be switched in position and/or shaped, configured, and positioned other than as shown in the illustrated embodiments. In fact, they may not be male and female couplers at all, but may take the form of flat couplers within the bodies of the modules that simply align with one another when the modules are installed into a system. It should be understood that terms such as inductive coupling and capacitive coupling as used herein are intended in the broadest sense to encompass any type of electrical coupling that does not involve direct conductor contact. This might include, for instance, magnetic resonance coupling, electrical resonance coupling, and any other type of non-contact coupling of electrical signals. These and other modifications, additions, and deletions may well be made by the skilled artisan without departing from the spirit and scope of the invention, which is delimited only by the claims.

What is claimed is:

1. A solar panel system for installation on a roof of a building structure, the solar panel system comprising:
    a solar power module capable of producing electrical energy when exposed to sunlight;
    the solar power module comprising a module body having opposite ends, a forward active portion having a bottom side and a top side, the forward active portion to be exposed when installed on a roof with other like solar power modules, and a headlap portion to a rear of the forward active portion and having a bottom side and a top side, the headlap portion to be covered by a bottom side of a forward active portion of another like module body when the module bodies are arranged in overlapping relationship, the top side of the forward active portion of the module body bearing an array of solar collectors that produce the electrical energy when exposed to sunlight;
    a first contactless coupler disposed and fixed on one of the opposite ends of the module body of the solar power module;
    a second contactless coupler disposed and fixed on the other one of the opposite ends of the module body of the solar power module and being arranged to align and couple with a first contactless coupler of another like module body when the module bodies are arranged in side-by-side relationship;
    a pair of third contactless couplers disposed and fixed on the bottom side of the forward portion of the module body of the solar power module;
    a pair of fourth contactless couplers disposed and fixed on the top side of the headlap portion of the module body of the solar power module;
    each of the pair of third contactless couplers being configured and positioned to align and couple with a fourth contactless coupler of another like module body when the module bodies are arranged in overlapping relationship with a bottom side of a forward active portion of a like module body overlying the top side of the headlap portion of the module body;
    the first contactless couplers of a plurality of solar power modules arranged in side-by-side relationship aligning and coupling with the second contactless couplers of adjacent power modules and each of the pair of third contactless couplers of solar power modules arranged in overlapping relationship with solar power modules in a lower course of solar power modules aligning and coupling with a fourth contactless coupler of an underlying solar power module, such that the electrical energy produced by each of the plurality of solar modules is aggregated.

2. The solar panel system of claim 1 wherein the first contactless coupler is a male contactless coupler and the second contactless coupler is a female contactless coupler.

3. The solar panel system of claim 1 wherein the first, second, third and fourth contactless couplers comprise inductive couplers.

4. A solar panel array comprising a first plurality of solar panels arranged side-by-side in a first course and a second plurality of solar panels arranged side-by-side in a second course, the second course partially overlapping the first course, contactless electrical couplers fixed on two ends of each of the first plurality of solar panels and the second plurality of the solar panels and being aligned and coupling with each other to aggregate electrical energy produced by the first course of side-by-side solar panels and to aggregate electrical energy produced by the second course of side-by-side solar panels and additional contactless electrical couplers fixed on each of the first plurality of solar panels and the second plurality of solar panels in the region of overlap between courses of solar panels and being aligned and coupling with each other to aggregate electrical energy produced by adjacent courses of solar panels, electrical energy produced by each solar panel of the solar panel array being coupled with an electrical energy produced by the other solar panels of the array without physical electrical contacts between the solar panels.

5. The solar panel array as claimed in claim 4 wherein the electrical energy produced by each solar panel of the solar panel array is coupled with electrical energy produced by the other solar panels of the solar panel array through inductive coupling.

6. The solar panel array as claimed in claim 5 wherein the solar panels of the solar panel array are arranged side-by-side in at least one course and the inductive coupling occurs at the two ends of adjacent solar panels of the course.

7. The solar panel array as claimed in claim 6 wherein the inductive coupling is achieved with male inductive couplers at one end of each solar panel and female inductive couplers at an opposite end of each adjacent solar panel.

8. The solar panel array as claimed in claim 6 wherein the solar panels are further arranged in overlapping courses with the inductive coupling occurring between solar panels of a lower course and solar panels of an upper course.

9. A solar electric module comprising first and second ends, a forward portion bearing solar collectors for converting sunlight to DC electrical energy and a rear headlap portion for being at least partially overlapped by another like solar electric module of a next higher course of solar electric modules, an inverter for converting the DC electrical energy to AC electrical energy, a first contactless electrical connector fixed at the first end of the solar electric module, and a second contactless electrical connector fixed at the second end of the solar electric module; a third contactless electrical connector fixed on a bottom surface of the solar electric module and a fourth contactless electrical connector fixed on a top surface of the solar electric module, the first, second, third, and fourth contactless electrical connectors being positioned such that the first and second contactless electrical connectors couple the AC electrical energy produced by the solar electric module with that produced by another like solar electric module when the solar electric modules are arranged in side-by-side relationship and the third and fourth contactless electrical connectors couple the AC electrical energy produced by the solar electric module with that produced by another like solar electric module when the solar electric modules are arranged in overlapping relationship.

10. The solar electric module of claim 9 wherein the first, second, third and fourth contactless electrical connectors comprise inductive electrical couplers.

11. The solar electric module of claim 10 wherein the first and third contactless electrical connectors are male couplers and the second and forth contactless electrical connectors are female couplers.

12. The solar electric module of claim 9 further comprising a communication link between the solar electric module and a remote location configured to transmit information regarding a status of the solar electric module to the remote location.

13. The solar electric module of claim 12 wherein the communication link is a wireless communication link.

* * * * *